United States Patent
Yui et al.

(10) Patent No.: US 10,618,229 B2
(45) Date of Patent: Apr. 14, 2020

(54) MOLDING METHOD USING VARTM PROCESS

(71) Applicant: MITSUBISHI AIRCRAFT CORPORATION, Aichi (JP)

(72) Inventors: Yuichi Yui, Tokyo (JP); Hiroshi Tokutomi, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 15/138,284

(22) Filed: Apr. 26, 2016

(65) Prior Publication Data

US 2016/0347008 A1 Dec. 1, 2016

(30) Foreign Application Priority Data

May 28, 2015 (JP) ................. 2015-108083

(51) Int. Cl.
*B29C 70/48* (2006.01)
*B29C 70/44* (2006.01)
*B29K 105/08* (2006.01)

(52) U.S. Cl.
CPC ........ *B29C 70/443* (2013.01); *B29K 2105/08* (2013.01); *B29K 2875/00* (2013.01); *B29K 2877/00* (2013.01); *B29K 2995/0065* (2013.01); *B29K 2995/0069* (2013.01)

(58) Field of Classification Search
CPC ........ B29C 70/443; B29C 70/44; B29C 70/48
See application file for complete search history.

(56) References Cited

U.S. PATENT DOCUMENTS

| 2008/0308960 | A1* | 12/2008 | Rydin | B29C 43/12 264/102 |
| 2010/0108245 | A1* | 5/2010 | Nishiyama | B29C 43/12 156/243 |
| 2013/0228956 | A1* | 9/2013 | Sekido | B29C 70/443 264/511 |

FOREIGN PATENT DOCUMENTS

JP 2012-228824 11/2012

* cited by examiner

*Primary Examiner* — Joseph S Del Sole
*Assistant Examiner* — Mohamed K Ahmed Ali
(74) *Attorney, Agent, or Firm* — Pearne & Gordon LLP

(57) ABSTRACT

In a molding method using a VaRTM process in which a workpiece is impregnated with resin in a vacuum, the flow channel resistance or the thickness of which is not constant, an air-permeable sheet only permeable to gas and not permeable to resin (liquid) is arranged at the bottom surface of the workpiece to cover the total length of the workpiece in a direction in which the flow channel resistance or the thickness of the workpiece varies, to impregnate the resin.

5 Claims, 2 Drawing Sheets

LARGE ←——— THICKNESS ———→ SMALL

MOLDING METHOD USING VARTM PROCESS

TECHNICAL FIELD

The present invention relates to a molding method using a vacuum-assisted resin transfer molding (VaRTM) process.

BACKGROUND ART

The VaRTM process is a method for molding a product made of composite material containing reinforcing fiber base material (such as glass fiber or carbon fiber) or the like.

In a conventional VaRTM process, a workpiece laid up on a jig is sealed with a vacuum bag film, in which a vacuum is produced. The vacuum lets resin (liquid) in a resin reservoir pass through a resin supply pipe communicating with the inside of the vacuum bag film, distributes the resin to one side or both sides of the workpiece through a resin distribution sheet (an injection medium) covering the workpiece, and then impregnates the workpiece with the resin <for example, see Patent Literature 1 listed below>. Excess resin is discharged from the workpiece through a resin discharging sheet (a discharge medium).

CITATION LIST

Patent Literature

{Patent Literature 1} Japanese Patent Application Publication No. 2012-228824

SUMMARY OF INVENTION

Technical Problem

The resin penetrates from a surface of the workpiece to the inside thereof and reaches the resin discharging sheet at a portion where a flow channel is short (the thickness is small) or flow channel resistance is low in the workpiece. This makes the resin flow through the portion even more (makes the flow channel resistance even lower). As a result, a portion where the flow channel is long (the thickness is large) or the flow channel resistance is high, in other words, a portion where the resin has not flowed yet, becomes more difficult for the resin to flow, and ends up in not being impregnated.

The problem that an unimpregnated portion is left as described above is generally common to a workpiece having a non-uniform thickness or a workpiece the flow channel resistance of which is non-uniform because of the structure.

The present invention has been made in view of the above technological state, and an object thereof is to propose a molding method using a VaRTM process, the molding method being capable of preventing the unimpregnation of resin positively and in an easy way.

Solution to Problem

A first aspect of the invention to solve the above problem provides a molding method using a VaRTM process in which a workpiece is impregnated with resin in a vacuum, wherein an air-permeable sheet only permeable to gas and not permeable to liquid resin is arranged at a negative pressure side of the workpiece to impregnate the workpiece with the resin.

A second aspect of the invention to solve the above problem provides the molding method using the VaRTM process according to the first aspect of the invention, wherein flow channel resistance of the workpiece is not constant, or a thickness of the workpiece is not constant, and the air-permeable sheet is arranged along a direction in which the flow channel resistance or the thickness of the workpiece varies, to impregnate the workpiece with the resin.

A third aspect of the invention to solve the above problem provides the molding method using the VaRTM process according to the second aspect of the invention, wherein an injection medium is arranged at a surface of an area of the workpiece other than an area where the flow channel resistance or the thickness is lower than the other areas.

A fourth aspect of the invention to solve the above problem provides the molding method using the VaRTM process according to the second or third aspect of the invention, wherein a trimming portion is provided to the workpiece, and the air-permeable sheet is arranged only at the trimming portion.

Advantageous Effects of Invention

According to the molding method using a VaRTM process of the first aspect of the invention mentioned above, in the molding method using the VaRTM process in which the workpiece is impregnated with the resin in a vacuum, the air-permeable sheet only permeable to gas and not permeable to liquid resin is arranged at the negative pressure side of the workpiece to impregnate the workpiece with the resin. Accordingly, the unimpregnation of the resin is prevented positively and in an easy way.

According to the molding method using the VaRTM process of the second aspect of the invention mentioned above, in the molding method using the VaRTM process according to the first aspect of the invention, the flow channel resistance of the workpiece is not constant, or the thickness of the workpiece is not constant, and the air-permeable sheet is arranged along the direction in which the flow channel resistance or the thickness of the workpiece varies, to impregnate the workpiece with the resin. Accordingly, the unimpregnation of the resin is prevented positively and in an easy way.

According to the molding method using the VaRTM process of the third aspect of the invention mentioned above, in the molding method using the VaRTM process according to the second aspect of the invention, the injection medium is arranged at a surface of an area of the workpiece other than an area where the flow channel resistance or the thickness is lower than the other areas. Accordingly, the unimpregnation of the resin is prevented more positively.

According to the molding method using the VaRTM process of the fourth aspect of the invention mentioned above, in the molding method using the VaRTM process according to the second or third aspect of the invention, the trimming portion is provided to the workpiece, and the air-permeable sheet is arranged only at the trimming portion. Accordingly, this prevents an impact on a shape of the product portion of the workpiece.

DESCRIPTION OF EMBODIMENTS

Hereinafter, a molding method using a VaRTM process according to the present invention will be described using an embodiment with reference to the drawings.

Embodiment

The molding method using the VaRTM process according to an embodiment of the present invention will be described with reference to FIGS. 1 to 4.

Figure 3:
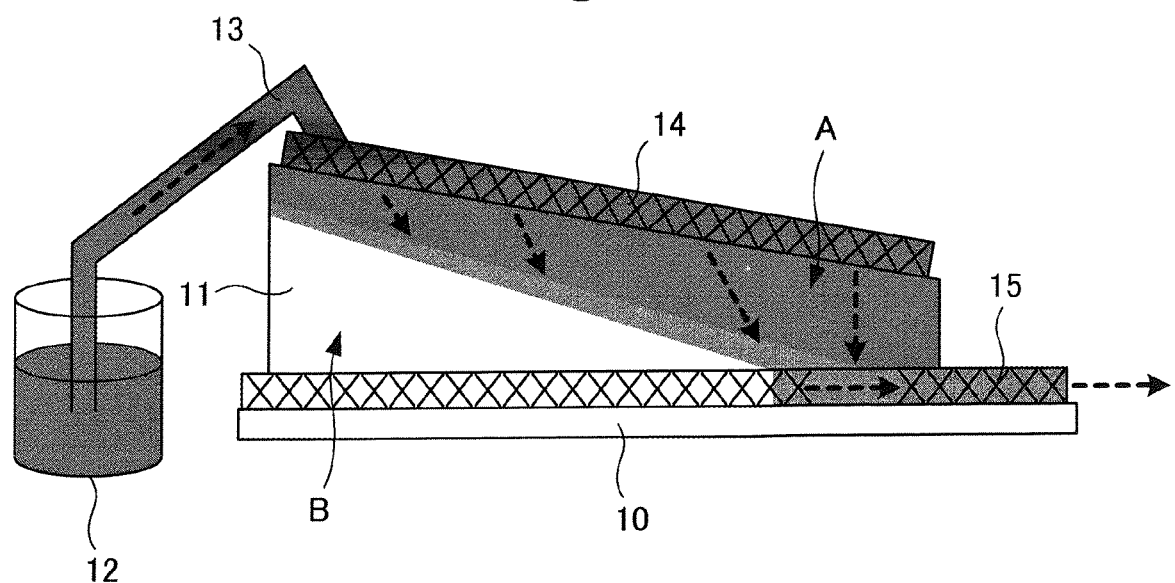
FIG. 3 is a schematic side view of an apparatus with which a general VaRTM process is performed.

FIG. 3 is a schematic side view of an apparatus with which a conventional VaRTM process is performed. Note that dashed arrows in the figure indicate approximate directions of resin impregnation.

In the conventional VaRTM process, a workpiece 11 laid up on a jig 10 is sealed with a vacuum bag film (not illustrated), in which a vacuum is produced. The vacuum lets resin (liquid) stored in a resin reservoir 12 pass through a resin supply pipe 13 communicating with the inside of the vacuum bag film, distributes the resin over the entire top surface of the workpiece 11 with a resin distribution sheet 14 as an injection medium covering the workpiece 11, and then impregnates the workpiece 11 with the resin. Excess resin is discharged from the workpiece 11 through a resin discharging sheet 15 disposed below the workpiece 11.

In FIG. 3, completion degrees of the resin impregnation are indicated in grayscale. A darker color indicates a portion where the completion degree of the impregnation is higher and a white color indicates a state where the corresponding portion has not impregnated with the resin yet. When the thickness of the workpiece 11 is not constant as illustrated in FIG. 3, the resin first reaches the resin discharging sheet 15 at a portion A and the periphery thereof where the thickness is small. This makes the flow channel resistance of the portion smaller and makes it easier for the resin to flow through the portion. As a result, a portion B and the periphery thereof where the thickness is large and the resin has not flowed yet becomes relatively difficult for the resin to flow, and ends up in not being impregnated.

Figure 4:
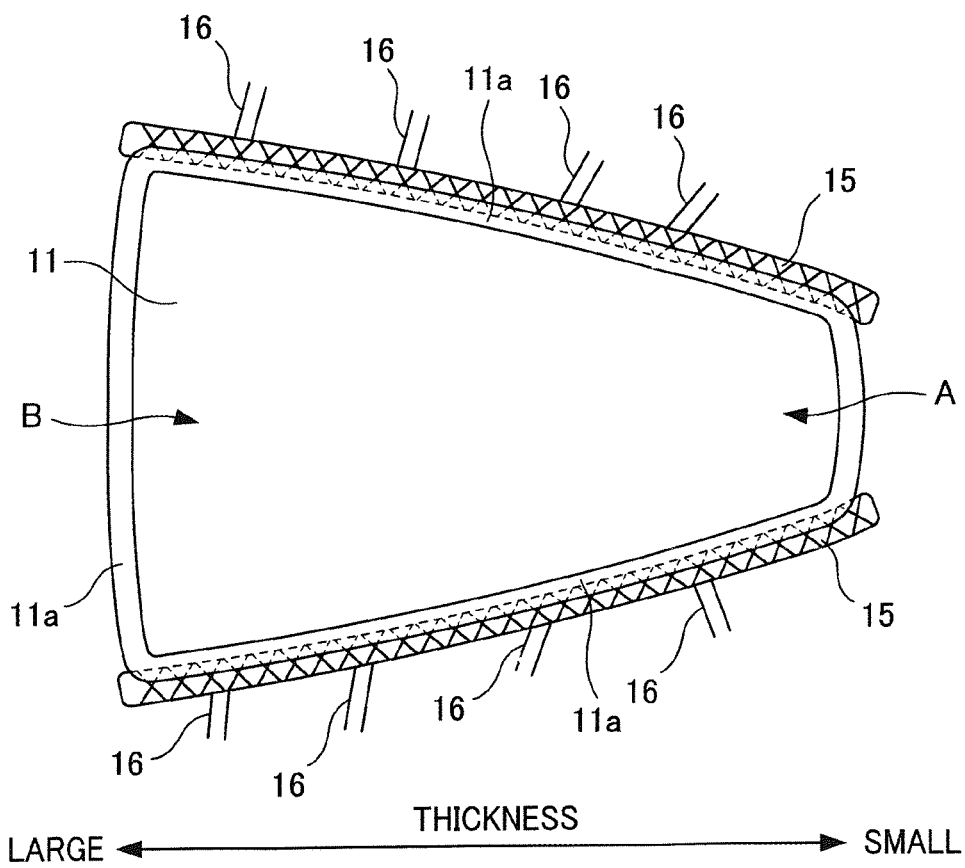
FIG. 4 is a schematic top view of an apparatus with which a VaRTM process is performed using resin discharging tubes.

FIG. 4 is a schematic top view of an apparatus with which a VaRTM process is performed using resin discharging tubes 16 (in this drawing, the resin distribution sheet 14 on the top surface of the workpiece 11 is omitted, and letters A and B correspond to the letters A and B in FIG. 3).

As illustrated in FIG. 4, the workpiece 11 has a trimming portion 11a which is trimmed off before finishing (which is not included in the product). The resin discharging sheet 15 is arranged at least on the bottom surface of the trimming portion 11a along a direction in which the thickness (or the flow channel resistance) of the workpiece 11 varies.

Although the resin discharging sheet 15 may be arranged on the entire bottom surface of the workpiece 11, arranging it only at the trimming portion 11a prevents the resin discharging sheet 15 from affecting a shape of the product portion of the workpiece 11.

As a possible solution to prevent the unimpregnation of the resin described above with reference to FIG. 3, there is a method illustrated in FIG. 4, in which multiple resin discharging tubes 16 for discharging the resin from the resin discharging sheet 15 to the outside are provided side by side along a direction in which the resin discharging sheet 15 extends. Each of the resin discharging tubes 16 is closed in sequence from a resin discharging tube 16 at which the resin impregnation has reached the resin discharging sheet 15.

However, it is difficult to close each resin discharging tubes 16 at an appropriate timing in this method. In addition, a limited number of resin discharging tubes 16 attachable to the resin discharging sheet 15 allows only stepwise control.

The present invention has solved the problems described above with an entirely new method using an air-permeable sheet unlike the above conventional methods.

Figure 1:
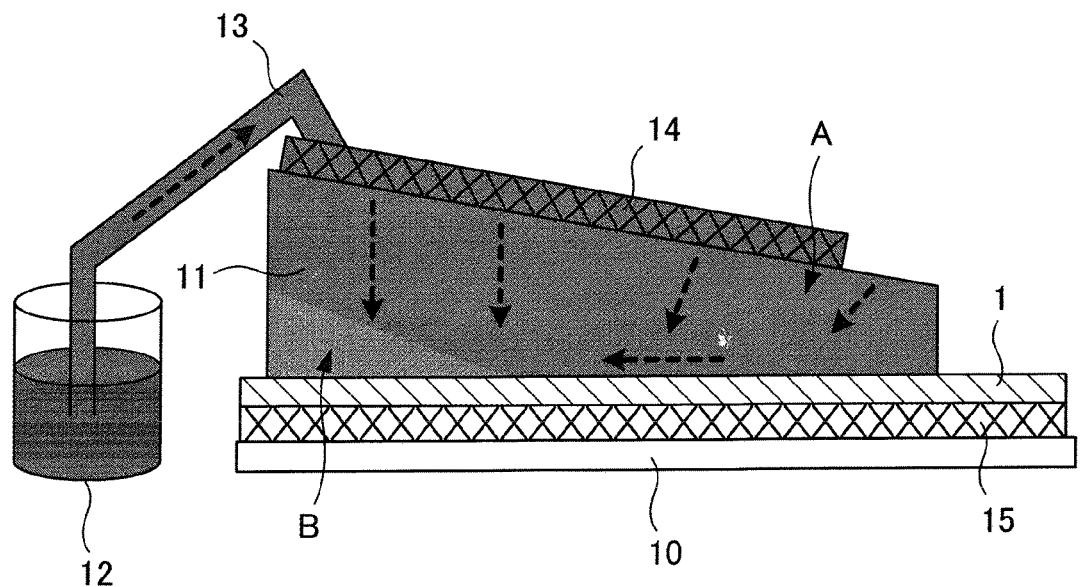
FIG. 1 is a schematic side view of an apparatus with which a VaRTM process is performed using an air-permeable sheet.
Figure 2:
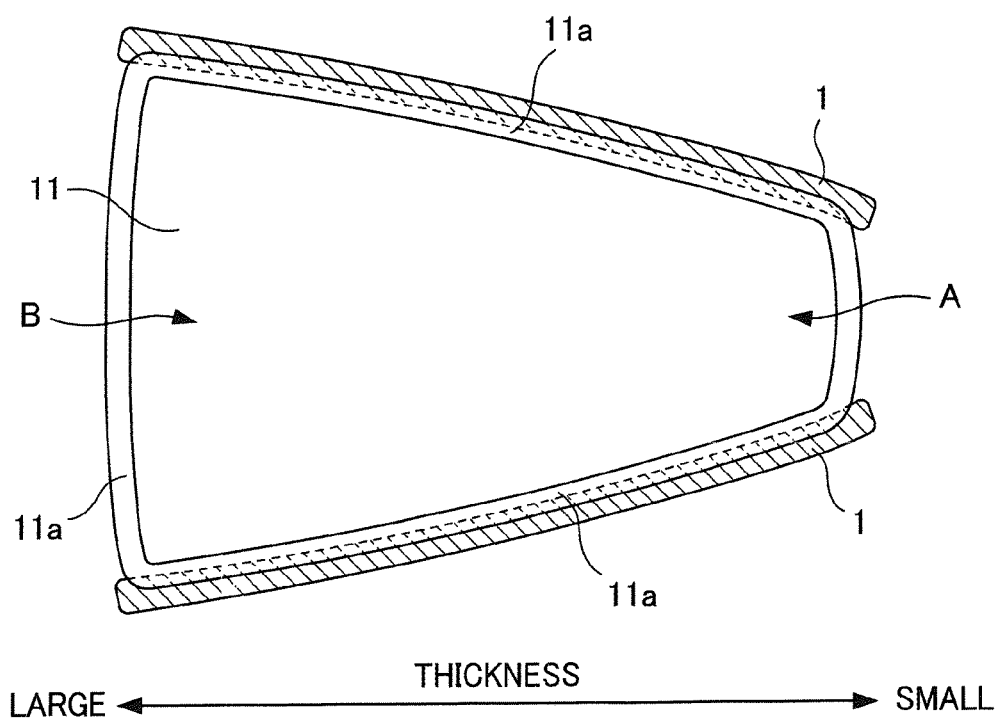
FIG. 2 is a schematic top view of the apparatus with which the VaRTM process is performed using the air-permeable sheet.

FIG. 1 is a schematic side view of an apparatus according to an embodiment of the present invention with which a VaRTM process is performed using an air-permeable sheet 1. Note that as in FIG. 3, dashed arrows in the figure indicate approximate directions of resin impregnation, and completion degrees of the resin impregnation are indicated in grayscale. FIG. 2 is a schematic top view of the apparatus with which the VaRTM process is performed using the air-permeable sheet 1.

As illustrated in FIG. 1, in the molding method using the VaRTM process according to the embodiment of the present invention, the air-permeable sheet 1 is provided at the bottom surface of a workpiece 11 (in other words, between the workpiece 11 and a resin discharging sheet 15) instead of using the resin discharging tubes 16 in the VaRTM process described above with reference to FIG. 3 or 4.

The air-permeable sheet 1 is formed by laminating nylon fabric and polyurethane resin and has a property of being permeable to gas but not permeable to liquid resin.

As illustrated in FIG. 2, in the molding method using the VaRTM process according to the embodiment of the present invention, the air-permeable sheet 1 is arranged at least on the bottom surface of a trimming portion 11a along a direction in which the thickness (or the flow channel resistance) of the workpiece 11 varies, and is arranged on the entire top surface of the resin discharging sheet 15.

Although the air-permeable sheet 1 maybe arranged on the entire bottom surface of the workpiece 11, arranging it only at the trimming portion 11a prevents the resin discharging sheet 15 from affecting a shape of the product portion of the workpiece 11. A resin discharging sheet 15 is arranged as in FIG. 4 though the resin discharging sheet 15 is omitted in FIG. 2.

With this configuration, the resin impregnation first reaches the bottom surface of the workpiece 11 at a portion A and the periphery thereof where the thickness is small. At this time, since the air-permeable sheet 1 is provided, the resin is not discharged through the resin discharging sheet 15 disposed below the air-permeable sheet 1. Accordingly, after the resin impregnation reaches the bottom surface of the workpiece 11 (the top surface of the air-permeable sheet 1) at the portion A and the periphery thereof, it is difficult for the resin to flow anymore to the portion A and the periphery thereof. As a result, the resin is apt to flow to a portion B and the periphery thereof, where the resin has not penetrated yet.

It is not the case that the resin does not flow to the portion A and the periphery thereof at all after the resin impregnation reaches the bottom surface of the workpiece 11. A small amount of resin which flows to the portion A and the periphery thereof and reaches the bottom surface of the workpiece 11 also flows along the air-permeable sheet 1 to the portion B and the periphery thereof where the resin has not penetrated, and the portion B and the periphery thereof is filled with the resin. This prevents the occurrence of an unimpregnated portion.

Thus, it is not necessary to provide multiple resin discharging tubes 16 and close each of them in sequence like the VaRTM process described with reference to FIG. 4, and it is possible to prevent the unimpregnation of the resin positively and easily. In addition, even when setting of flow lines for the resin is not appropriate, and the resin penetrates first at a portion (for example, around the center) other than an end portion of the workpiece 11, it is possible to obtain the same advantageous effect.

Moreover, in FIG. 1, the length of the resin distribution sheet 14 is adjusted to be short on purpose such that the resin distribution sheet 14 does not cover a portion where the thickness of the workpiece 11 is small. This reduces the amount of the resin distributed with the resin distribution sheet 14 to an area like the portion A and the periphery thereof where the resin easily penetrates, and thereby promotes the resin impregnation more at the portion B and the periphery thereof.

In other words, the unimpregnation of the resin is prevented more positively by arranging the resin distribution sheet 14, which distributes the injected resin, on the top surface of an area of the workpiece 11 other than an area where the flow channel resistance is lower than the other areas.

Note that although the workpiece 11 the thickness of which is not constant is described above as an example, the present embodiment is not limited to this example. It means that the present invention is also applicable to a workpiece the flow channel resistance of which is not constant.

In the above example, the resin distribution sheet 14 (injection medium) is arranged on the top surface of the workpiece 11, and the air-permeable sheet 1 and the resin discharging sheet 15 are arranged on the bottom surface thereof. However, the present embodiment is not limited to this example. It means that the resin distribution sheet 14, and the air-permeable sheet 1 and the resin discharging sheet 15 only need to be arranged on different surfaces (preferably surfaces opposed to each other) of the workpiece 11. Here, the side at which the air-permeable sheet 1 is provided needs to be a negative pressure (suction) side.

INDUSTRIAL APPLICABILITY

The present invention is favorably applicable as a molding method using the VaRTM process.

REFERENCE SIGNS LIST

1 AIR-PERMEABLE SHEET
10 JIG
11 WORKPIECE
11*A* TRIMMING PORTION (OF WORKPIECE)
12 RESIN RESERVOIR
13 RESIN SUPPLY PIPE
14 RESIN DISTRIBUTION SHEET
15 RESIN DISCHARGING SHEET
16 RESIN DISCHARGING TUBE

The invention claimed is:

1. A molding method using a vacuum-assisted resin transfer molding process in which a workpiece is impregnated with resin in a vacuum, the method comprising:
   arranging an air-permeable sheet only permeable to gas and not permeable to liquid resin and a resin distribution sheet for distributing the liquid resin on different surfaces of the workpiece that are opposed to each other, wherein the air-permeable sheet is arranged at a negative pressure side of the workpiece;
   arranging a resin discharging sheet for discharging the liquid resin on a surface of the air-permeable sheet opposite to the workpiece; and
   impregnating the workpiece with the resin, wherein the workpiece has a non-uniform flow channel resistance or a non-uniform thickness, the air-permeable sheet is arranged along a direction in which the flow channel resistance or the thickness of the workpiece varies, to impregnate the workpiece with the resin, and the resin which reaches the bottom surface of the workpiece flows along the air-permeable sheet to a portion where the resin has not penetrated; and
   wherein a trimming portion is provided to the workpiece, the trimming portion being trimmed off before finishing, and the air-permeable sheet is arranged only on the trimming portion.

2. The molding method using the vacuum-assisted resin transfer molding process according to claim 1, wherein
   the resin distribution sheet is arranged on a surface of an area of the workpiece other than an area where the flow channel resistance or the thickness is lower than the other areas.

3. The molding method using the vacuum-assisted resin transfer molding process according to claim 2, wherein
   a trimming portion is provided to the workpiece, and
   the air-permeable sheet is arranged only on the trimming portion.

4. The molding method using the vacuum-assisted resin transfer molding process according to claim 1, wherein the resin distribution sheet is arranged on a surface of an area of the workpiece other than an area where the thickness is lower than the other areas.

5. The molding method using the vacuum-assisted resin transfer molding process according to claim 1, wherein the resin which reaches the bottom surface of the workpiece flows along the air-permeable sheet from a first portion to a second portion, the flow channel resistance of the workpiece in the second portion being larger than the flow channel resistance of the workpiece in the first portion, or the thickness of the workpiece in the second portion being larger than the thickness of the workpiece in the first portion.

* * * * *